United States Patent
Lou et al.

(10) Patent No.: US 9,313,519 B2
(45) Date of Patent: Apr. 12, 2016

(54) INTERPOLATION FILTER SELECTION USING PREDICTION UNIT (PU) SIZE

(75) Inventors: Jian Lou, San Diego, CA (US); David M. Baylon, San Diego, CA (US); Koohyar Minoo, San Diego, CA (US); Krit Panusopone, San Diego, CA (US); Limin Wang, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 382 days.

(21) Appl. No.: 13/415,907

(22) Filed: Mar. 9, 2012

(65) Prior Publication Data

US 2012/0230413 A1  Sep. 13, 2012

Related U.S. Application Data

(60) Provisional application No. 61/451,827, filed on Mar. 11, 2011, provisional application No. 61/453,278, filed on Mar. 16, 2011.

(51) Int. Cl.
*H04N 19/117* (2014.01)
*H04N 19/523* (2014.01)
*H04N 19/46* (2014.01)

(52) U.S. Cl.
CPC ........... *H04N 19/523* (2014.11); *H04N 19/117* (2014.11); *H04N 19/46* (2014.11)

(58) Field of Classification Search
CPC .................. H04N 19/00739; H04N 19/00545; H04N 19/00066
USPC ..................................... 375/240.16
See application file for complete search history.

(56) References Cited

U.S. PATENT DOCUMENTS

| 5,511,137 A | 4/1996 | Okada |
| 6,252,576 B1 | 6/2001 | Nottingham |

(Continued)

FOREIGN PATENT DOCUMENTS

| EP | 1359763 | 11/2003 |
| EP | 1507415 | 2/2005 |

(Continued)

OTHER PUBLICATIONS

Alshina E. et al.:"CE3: Experimental results of DCTIF by Samsung", 4,JCT-VC Meeting; 95, MPEG Meeting; Daegu; (Joint Collaborative Team on Video Coding of ISO/IEC JTC1/SC29/WG1 and ITU-T SG.16),No. JCTVC-D344, Jan. 15, 2011, Sections 1,2 and 6.

(Continued)

*Primary Examiner* — Dave Czekaj
*Assistant Examiner* — Berteau Joisil
(74) *Attorney, Agent, or Firm* — Young Basile Hanlon & MacFarlane P.C.

(57) ABSTRACT

In one embodiment, a method for encoding or decoding video content is provided. The method includes determining a set of interpolation filters for use in interpolating sub-pel pixel values and a mapping between interpolation filters in the set of interpolation filters and different sizes of prediction units (PUs) of video content. A PU of video content is received and a size of the received PU is determined The method determines an interpolation filter in the set of interpolation filters based on a mapping between the interpolation filter and the size of the received PU to interpolate a sub-pel pixel value for use in a temporal prediction process for the PU.

15 Claims, 6 Drawing Sheets

(56) References Cited

U.S. PATENT DOCUMENTS

| | | | |
|---|---|---|---|
| 6,724,847 B1 | 4/2004 | Kallman et al. | |
| 7,155,213 B1 | 12/2006 | Almeda et al. | |
| 7,349,473 B2 | 3/2008 | Hallapuro et al. | |
| 7,505,636 B2 | 3/2009 | MacInnis et al. | |
| 7,555,043 B2 | 6/2009 | Sato et al. | |
| 7,660,471 B2 | 2/2010 | Bjontegaard | |
| 7,778,494 B2 | 8/2010 | Shastry et al. | |
| 7,958,177 B2 | 6/2011 | Zhu | |
| 7,965,177 B2 | 6/2011 | Kobayashi et al. | |
| 8,208,564 B2 | 6/2012 | Bossen et al. | |
| 8,437,581 B2 | 5/2013 | Lou et al. | |
| 8,451,889 B2 | 5/2013 | Lee et al. | |
| 8,565,558 B2 | 10/2013 | Lou et al. | |
| 8,576,906 B2 | 11/2013 | Andersson et al. | |
| 8,792,559 B2 | 7/2014 | Robertson et al. | |
| 8,811,484 B2 | 8/2014 | Motta et al. | |
| 2003/0112864 A1 | 6/2003 | Karczewicz et al. | |
| 2003/0156646 A1 | 8/2003 | Hsu et al. | |
| 2003/0194007 A1 | 10/2003 | Chen et al. | |
| 2003/0194009 A1 | 10/2003 | Srinivasan | |
| 2004/0062307 A1 | 4/2004 | Hallapuro et al. | |
| 2004/0076333 A1 | 4/2004 | Zhang et al. | |
| 2004/0213470 A1 | 10/2004 | Sato et al. | |
| 2005/0010561 A1 | 1/2005 | de Bois et al. | |
| 2005/0105611 A1 | 5/2005 | Bjontegaard | |
| 2006/0133506 A1 | 6/2006 | Dang | |
| 2006/0268991 A1* | 11/2006 | Segall et al. | 375/240.24 |
| 2006/0294171 A1 | 12/2006 | Bossen et al. | |
| 2007/0133687 A1 | 6/2007 | Wittmann et al. | |
| 2008/0075165 A1 | 3/2008 | Ugur et al. | |
| 2008/0089418 A1 | 4/2008 | Kim et al. | |
| 2008/0166068 A1 | 7/2008 | Fuchigami | |
| 2008/0205793 A1 | 8/2008 | Nilsson et al. | |
| 2009/0016634 A1 | 1/2009 | Cox et al. | |
| 2009/0257499 A1* | 10/2009 | Karczewicz et al. | 375/240.16 |
| 2009/0257503 A1* | 10/2009 | Ye et al. | 375/240.17 |
| 2010/0002770 A1* | 1/2010 | Motta et al. | 375/240.16 |
| 2010/0111182 A1 | 5/2010 | Karczewicz et al. | |
| 2010/0135398 A1 | 6/2010 | Wittmann et al. | |
| 2010/0246998 A1 | 9/2010 | He et al. | |
| 2011/0116546 A1 | 5/2011 | Guo et al. | |
| 2011/0200108 A1 | 8/2011 | Joshi et al. | |
| 2011/0243471 A1 | 10/2011 | Alshina et al. | |
| 2011/0249737 A1 | 10/2011 | Joshi et al. | |
| 2012/0008686 A1 | 1/2012 | Haskell | |
| 2012/0134425 A1 | 5/2012 | Kossentini et al. | |
| 2012/0183068 A1 | 7/2012 | Lou et al. | |
| 2012/0224639 A1 | 9/2012 | Lou et al. | |
| 2012/0230407 A1 | 9/2012 | Minoo et al. | |
| 2012/0328020 A1 | 12/2012 | Lou et al. | |
| 2013/0003841 A1 | 1/2013 | Minoo et al. | |
| 2013/0051463 A1 | 2/2013 | Minoo et al. | |
| 2014/0078394 A1 | 3/2014 | Lou et al. | |

FOREIGN PATENT DOCUMENTS

| | | |
|---|---|---|
| EP | 1973350 | 9/2008 |
| WO | 2004006558 A2 | 1/2004 |
| WO | WO2006006609 | 1/2006 |
| WO | WO2007011189 | 1/2007 |
| WO | WO2010039288 | 4/2010 |
| WO | WO2011046587 | 4/2011 |

OTHER PUBLICATIONS

H.26L Test Model Long Term No. 3 (TML-3) Draft 0, ITU-T Telecommunication Standardization Sector of ITU; May 16, 2000, pp. 1-24.

ISR & Written Opinion, RE: Application # PCT/US2012/045297; Oct. 2, 2012.

ISR and Written Opinion of the International Searching Authority, for Int'l Application No. PCT/US2012/021912; Mar. 12, 2012.

ISR, "ISR Search Report and Written Opinion of the International Searching Authority" for International Application No. ISR/US2013/056017 dated Oct. 15, 2013, 13 pages.

ISR, & Written Opinion of the International Searching Authority for InternationalApplication No. ISR/US2012/027213, May 2, 2012, 11 pages.

ISR, & Written Opinion of the International Searching Authority for InternationalApplication No. ISR/US2012/027227, May 2, 2012, 13 pages.

ISR/WO PCT/US2012044039, related matter (GOGL-1058)Nov. 12, 2012.

Ji et al., "Block-Wise Adaptive Motion Accuracy Based B-Picture Coding With Low-Complexity Motion Compensation," IEEE Transactions on Circuits and Systems for Video Technology; vol. 17, No. 8; Aug. 1, 2007; pp. 1085-1090.

Lou_J et al.: "New DCT-based interpolation filters", 95. MPEG Meeting; Daegu; (Motion Picture Expert Group or ISO/IEC JTC1/SC29/WG11), No. m19007, Jan. 20, 2011, section 3.

Sato K. et al.; "Adaptive MC interpolation for memory access reduction in JVT video coding," Seventh International Symposium on Signal Processing and its Applications; vol. 1; Jul. 1, 2003; pp. 77-80.

Wedi T et al.: "Motion-and aliasing-compensated prediction for hybrid video coding", IEE Transactions on Circuits and Systems for video Technology, IEE Service Center, Piscataway, NJ, US,vol. 13, No. 7, Jul. 1, 2003, pp. 577-586.

Wedi: "New Results on Adaptive Interpolation Filter", 3, JVT-VC Meeting; 60. MPEG Meeting; Fairfax,US; (Joint Collaborative Team of ISO/IEC/JTC1/SC29/WG11 and ITU-T SG.16), No. JVT-C059, May 10, 2002, Sections 1 and 2.

Xiong L.: "Spatial upsampling filter," 17, JVT Meeting; 74. Mpeg Meeting; 14*Oct. 2005; Nice, FR (Joint Video Team of ISO/IEC JTC1/SC29/WG11 and ITU-T SG16_, No. JVT-Q051, Oct. 11, 2005, all pages.

Yoshino T.,et al.; "Enhanced switching of interpolation filter for HEVC," Motion Picture Expert Group or ISO/IEC; Oct. 28, 2010.

PCT Search Report and Written Opinion, RE: Application #PCT/US2012/028467; May 22, 2012.

Kazushi Sato et al., "Adaptive MC Interpolation Filter for Complexity Reduction" No. JVT-C052, May 6, 2002, pp. 1-6.

Lou J et al., "Motorola Mobility's adaptive interpolation filter" MPEG Meeting; Geneva, Mar. 16, 2011.

Bankoski et al. "VP8 Data Format and Decoding Guide; draft-bankoski-vp8-bitstraam-02" Network Working Group. Internet-Draft, May 18, 2011, 288 pp.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Overview; VP7 Data Format and Decoder. Version 1.5. On2 Technologies, Inc. Dated Mar. 28, 2005.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

(56) References Cited

OTHER PUBLICATIONS

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

VP8 Data Format and Decoding Guide. WebM Project. Google On2. Dated: Dec. 1, 2010.

\* cited by examiner

INTERPOLATION FILTER SELECTION USING PREDICTION UNIT (PU) SIZE

CROSS REFERENCE TO RELATED APPLICATIONS

The present application claims priority to U.S. Provisional App. No. 61/451,827 for "Adaptive Interpolation with Implicit Signaling of the Interpolation Choice" filed Mar. 11, 2011 and U.S. Provisional App. No. 61/453,278 for "High Level Adaptive Interpolation Filter Signaling" filed Mar. 16, 2011, the contents of which is incorporated herein by reference in their entirety.

The present application is related to U.S. application Ser. No. 13/415,901 for "Interpolation Filter Selection Using a Prediction Index" filed concurrently, the contents of which is incorporated herein by reference in their entirety.

BACKGROUND

Particular embodiments generally relate to video compression.

High-efficiency video coding (HEVC) is a block-based hybrid spatial and temporal predictive coding scheme. Similar to other video coding standards, such as motion picture experts group (MPEG)-1, MPEG-2, and MPEG-4, HEVC supports intra-picture, such as I picture, and inter-picture, such as B picture. In HEVC, P and B pictures are consolidated into a general B picture that can be used as a reference picture.

Intra-picture is coded without referring to any other pictures. Thus, only spatial prediction is allowed for a coding unit (CU)/prediction unit (PU) inside an intra-picture. Inter-picture, however, supports both intra- and inter-prediction. A CU/PU in an inter-picture may be either spatially or temporally predictive coded. Temporal predictive coding may reference pictures that were previously coded.

Temporal motion prediction is an effective method to increase the coding efficiency and provides high compression. HEVC uses a translational model for motion prediction. According to the translational model, a prediction signal for a given block in a current picture is generated from a corresponding block in a reference picture. The coordinates of the reference block are given by a motion vector that describes the translational motion along horizontal (x) and vertical (y) directions that would be added to or subtracted from the coordinates of the current block. A decoder needs the motion vector to decode the compressed video.

The pixels in the reference frame are used as the prediction. In one example, the motion may be captured in integer pixels. However, not all objects move with the spacing of integer pixels. For example, since an object motion is completely unrelated to the sampling grid, sometimes the object motion is more like a fractional-pel motion than a full-pel one. Thus, HEVC allows for motion vectors with sub-pel (fractional) pixel accuracy.

In order to estimate and compensate sub-pel displacements, the image signal on these sub-pel positions is generated by an interpolation process. In HEVC, sub-pel pixel interpolation is performed using finite impulse response (FIR) filters. Generally, the filter may have 8 taps to determine the sub-pel pixel values for sub-pel pixel positions, such as half-pel and quarter-pel positions. The taps of an interpolation filter weight the integer pixels with coefficient values to generate the sub-pel signals. Different coefficients may produce different compression performance in signal distortion and noise.

In one example, the coefficients for the filter are fixed and applicable to compression of all sequences. In another example, the filter choice may vary from sequence to sequence, within a sequence, from picture to picture, from reference to reference, or within a picture, from PU to PU. This is referred to as an adaptive interpolation filter (AIF). To use an adaptive interpolation filter, the choice of which adaptive filter needs to be communicated to the decoder explicitly by sending the filter coefficients or by sending information indicating the preferred filter to be used. The explicit signaling increases the overhead as the information needs to be encoded and sent to the decoder for every PU that is being compressed and is costly because it increases the required bit rate in temporally predictive pictures.

SUMMARY

In one embodiment, a method for encoding or decoding video content is provided. The method includes determining a set of interpolation filters for use in interpolating sub-pel pixel values and a mapping between interpolation filters in the set of interpolation filters and different sizes of prediction units (PUs) of video content. A PU of video content is received and a size of the received PU is determined The method determines an interpolation filter in the set of interpolation filters based on a mapping between the interpolation filter and the size of the received PU to interpolate a sub-pel pixel value for use in a temporal prediction process for the PU.

In one embodiment, an apparatus configured to encode or decode video content is provided including: one or more computer processors; and a computer-readable storage medium comprising instructions for controlling the one or more computer processors to be operable to: determine a set of interpolation filters for use in interpolating sub-pel pixel values and a mapping between interpolation filters in the set of interpolation filters and different sizes of prediction units (PUs) of video content; receive a PU of video content; determine a size of the received PU; and determine an interpolation filter in the set of interpolation filters based on a mapping between the interpolation filter and the size of the received PU to interpolate a sub-pel pixel value for use in a temporal prediction process for the PU.

In one embodiment, a non-transitory computer-readable storage medium is provided including instructions for encoding or decoding video content, the instructions for controlling the one or more computer processors to be operable to: determine a set of interpolation filters for use in interpolating sub-pel pixel values and a mapping between interpolation filters in the set of interpolation filters and different sizes of prediction units (PUs) of video content; receive a PU of video content; determine a size of the received PU; and determine an interpolation filter in the set of interpolation filters based on a mapping between the interpolation filter and the size of the received PU to interpolate a sub-pel pixel value for use in a temporal prediction process for the PU.

The following detailed description and accompanying drawings provide a more detailed understanding of the nature and advantages of the present invention.

DETAILED DESCRIPTION

Described herein are techniques for a video compression system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Overview

Figure 1:
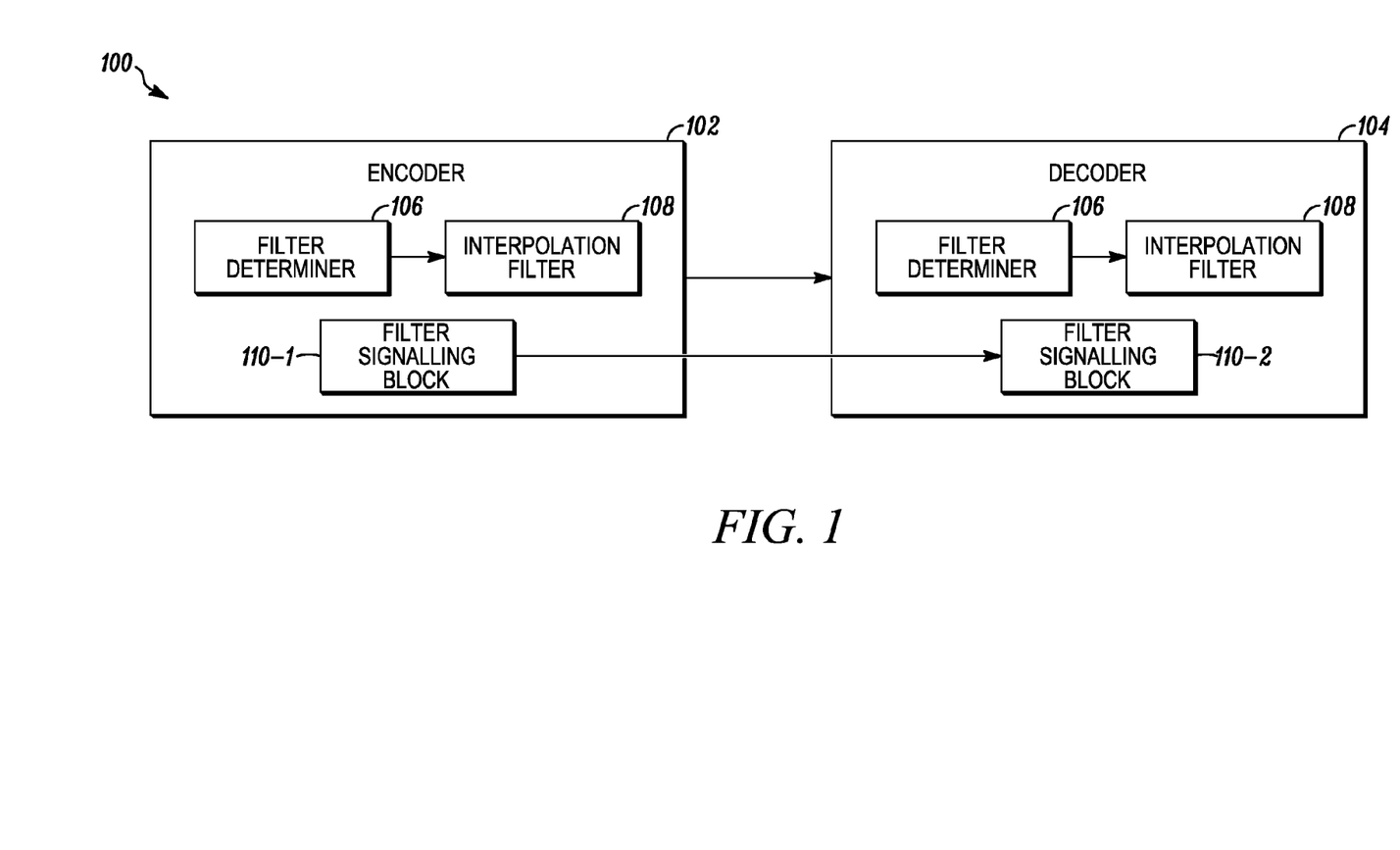
FIG. 1 depicts an example of a system for encoding and decoding video content according to one embodiment.

FIG. 1 depicts an example of a system 100 for encoding and decoding video content according to one embodiment. System 100 includes an encoder 102 and a decoder 104, both of which will be described in more detail below. Encoder 102 and decoder 104 perform temporal prediction through motion estimation and motion compensation. The temporal prediction searches for a best match prediction for a current prediction unit (PU) over reference pictures. The best match prediction is described by a motion vector (MV) and associated reference picture ID. Also, a PU in a B picture may have up to two motion vectors.

The temporal prediction allows for fractional (sub-pel) picture accuracy. Sub-pel pixel prediction is used because motion during two instances of time (the current and reference frames' capture times) can correspond to a sub-pel pixel position in pixel coordinates and generation of different prediction data corresponding to each sub-pel pixel positions allows for the possibility of conditioning the prediction signal to better match the signal in the current PU.

The temporal prediction may use adaptive sub-pel pixel interpolation for the PU. In this case, different interpolation filters 108 may be used to determine the sub-pel pixel values. Interpolation filters 108 include taps that weight full-pel pixel values with coefficient values that are used to determine the sub-pel pixel values for different sub-pel pixel positions, such as half-pel and quarter pel positions. When a different interpolation filter 108 is used, the interpolation filter may use different values for coefficients and/or a different number of taps.

Encoder 102 and decoder 104 need to know which interpolation filter 108 to use in encoding and decoding a unit of video content, such as a PU. Particular embodiments may use an implicit signaling method for determining which interpolation filter 108 to use to interpolate sub-pel pixel values. In one embodiment, information already available to both encoder 102 and decoder 104 is used to determine which interpolation filter 106 to use. For example, a filter determiner 106 in either encoder 102 or decoder 104 receives a set of interpolation filters with mappings between the interpolation filters and coding parameters used in the compression process. For example, the set of interpolation filters may be installed or stored in memory of encoder 102 and decoder 104. Filter determiner 106 uses the coding parameter used in the compression process to determine an interpolation filter 108 based on the mapping. For example, filter determiner 106 may use PU size or a prediction index (for uni-prediction or bi-prediction mode) to determine which interpolation filter 108 to use. The mappings may be already known to encoder 102 and decoder 104 before the encoding of PU or decoding of bits for the PU. Because encoder 102 and decoder 104 use information already known to encoder 102 or decoder 104 to determine the appropriate interpolation filter 108, the interpolation filter decision is implicitly determined without requiring explicit communication between encoder 102 and decoder 104 for encoding and decoding the unit of video content.

Although the implicit signaling method may be used, it may be useful to explicitly have communication between encoder 102 and decoder 104 at certain times. For example, an explicit communication from encoder 102 to decoder 104 is used to determine which interpolation filter 108 to use. In one example, a filter signaling block 110-1 in encoder 102 may communicate a filter signaling block 110-2 in decoder 104. The communication between encoder 102 and decoder 104 may vary, such as the communications may be the mappings themselves, an update to the mappings, or information for use in determining which interpolation filter to use based on the mappings. The explicit signaling may be communicated using high level syntax(es) in a sequence, picture, or slice header. The signaling may be performed during an effective period of the high level syntax(es).

Encoder and Decoder Examples

Figure 2A:
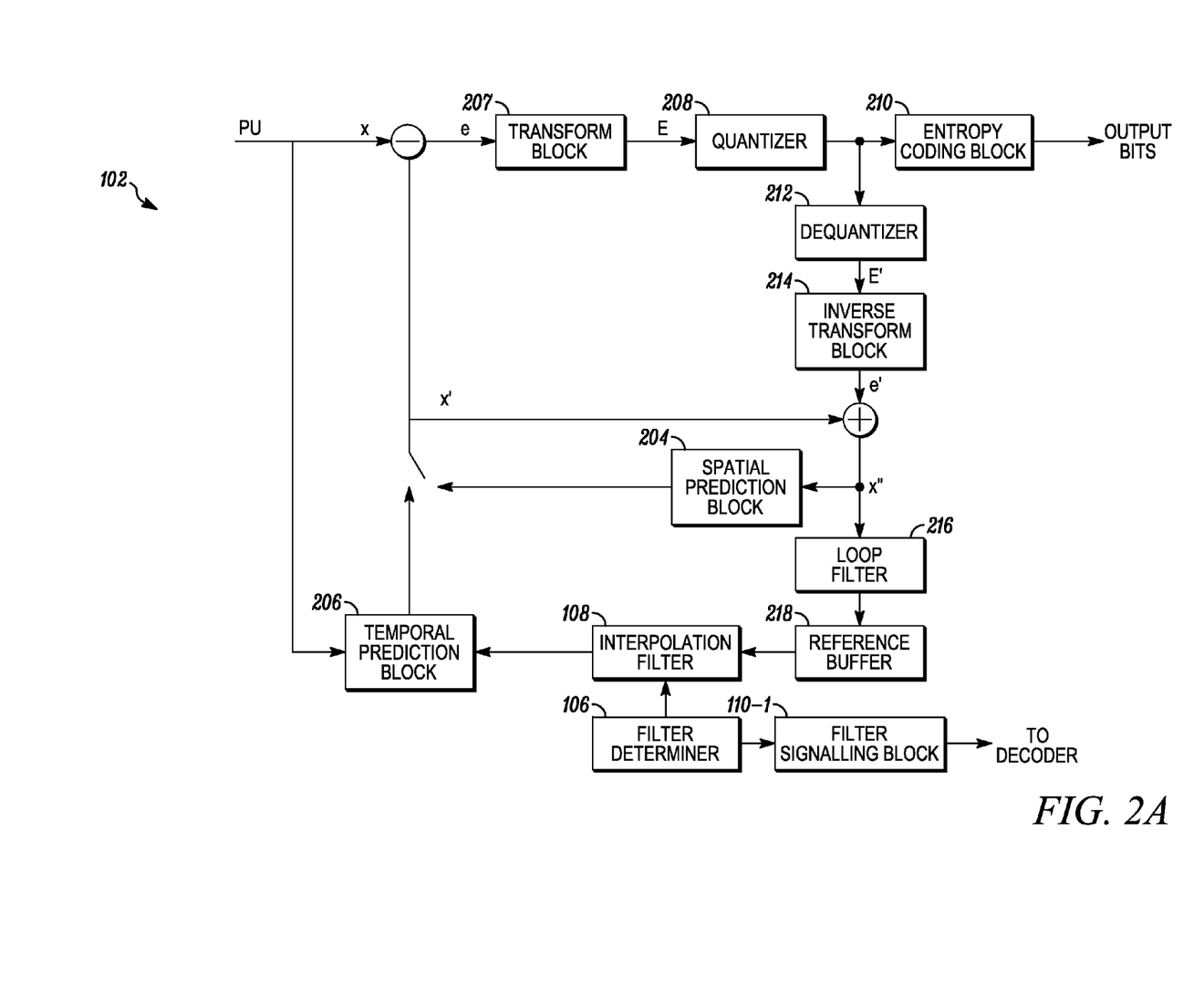
FIG. 2A depicts an example of an encoder according to one embodiment.

FIG. 2A depicts an example of an encoder 102 according to one embodiment. A general operation of encoder 102 will now be described. It will be understood that variations on the encoding process described will be appreciated by a person skilled in the art based on the disclosure and teachings herein.

For a current PU, x, a prediction PU, x', is obtained through either spatial prediction or temporal prediction. The prediction PU is then subtracted from the current PU, resulting in a residual PU, e. A spatial prediction block 204 may include different spatial prediction directions per PU, such as horizontal, vertical, 45-degree diagonal, 135-degree diagonal, DC (flat averaging), and planar.

A temporal prediction block 206 performs temporal prediction through a motion estimation and motion compensation operation. The motion estimation operation searches for a best match prediction for the current PU over reference pictures. The best match prediction is described by a motion vector (MV) and associated reference picture (refIdx). The motion vector and associated reference picture are included in the coded bit stream.

Transform block 207 performs a transform operation with the residual PU, e. Transform block 207 outputs the residual PU in a transform domain, E.

A quantizer 208 then quantizes the transform coefficients of the residual PU, E. Quantizer 208 converts the transform coefficients into a finite number of possible values. Entropy coding block 210 entropy encodes the quantized coefficients, which results in final compression bits to be transmitted. Different entropy coding methods may be used, such as context-adaptive variable length coding (CAVLC) or context-adaptive binary arithmetic coding (CABAC).

Also, in a decoding process within encoder 102, a de-quantizer 212 de-quantizes the quantized transform coefficients of the residual PU. De-quantizer 212 then outputs the de-quantized transform coefficients, E'. An inverse transform block 214 receives the de-quantized transform coefficients, which are then inverse transformed resulting in a reconstructed residual PU, e'. The reconstructed PU, e', is then added to the corresponding prediction, x', either spatial or temporal, to form the new reconstructed PU, x''. A loop filter 216 performs de-blocking on the reconstructed PU, x'', to reduce blocking artifacts. Additionally, loop filter 216 may perform a sample adaptive offset process after the completion of the de-blocking filter process for the decoded picture, which compensates for a pixel value offset between reconstructed pixels and original pixels. Also, loop filter 216 may perform adaptive filtering over the reconstructed PU, which minimizes coding distortion between the input and output pictures. Additionally, if the reconstructed pictures are reference pictures, the reference pictures are stored in a reference buffer 218 for future temporal prediction.

Interpolation filter 108 interpolates sub-pel pixel values for temporal prediction block 206. Filter determiner 106 implicitly determines interpolation filter 108 as will be described below. Also, filter signaling block 110-1 explicitly signals information for use in determining interpolation filter 108 at certain times. Temporal prediction block 206 then uses the sub-pel pixel values outputted by interpolation filter 108 to generate a prediction x' of a current PU.

Figure 2B:
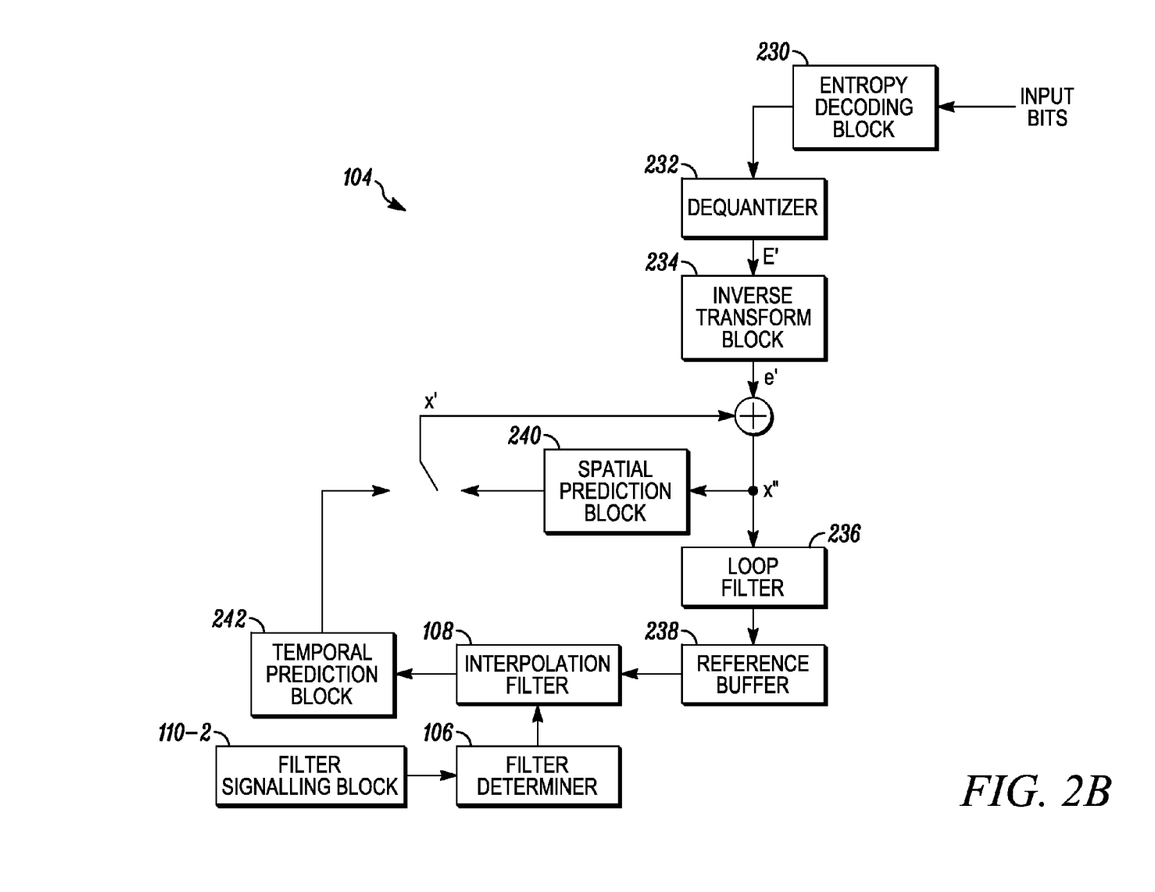
FIG. 2B depicts an example of decoder according to one embodiment.

FIG. 2B depicts an example of decoder 104 according to one embodiment. A general operation of decoder 104 will now be described. It will be understood that variations on the decoding process described will be appreciated by a person skilled in the art based on the disclosure and teachings herein. Decoder 104 receives input bits from encoder 102 for compressed video content.

An entropy decoding block 230 performs entropy decoding on input bits corresponding to quantized transform coefficients of a residual PU. A de-quantizer 232 de-quantizes the quantized transform coefficients of the residual PU. De-quantizer 232 then outputs the de-quantized transform coefficients of the residual PU, E'. An inverse transform block 234 receives the de-quantized transform coefficients, which are then inverse transformed resulting in a reconstructed residual PU, e'.

The reconstructed PU, e', is then added to the corresponding prediction, x', either spatial or temporal, to form the new constructed PU, x''. A loop filter 236 performs de-blocking on the reconstructed PU, x'', to reduce blocking artifacts. Additionally, loop filter 236 may perform a sample adaptive offset process after the completion of the de-blocking filter process for the decoded picture, which compensates for a pixel value offset between reconstructed pixels and original pixels. Also, loop filter 236 may perform an adaptive loop filter over the reconstructed PU, which minimizes coding distortion between the input and output pictures. Additionally, if the reconstructed pictures are reference pictures, the reference pictures are stored in a reference buffer 238 for future temporal prediction.

The prediction PU, x', is obtained through either spatial prediction or temporal prediction. A spatial prediction block 240 may receive decoded spatial prediction directions per PU, such as horizontal, vertical, 45-degree diagonal, 135-degree diagonal, DC (flat averaging), and planar. The spatial prediction directions are used to determine the prediction PU, x'.

Interpolation filter 108 interpolates sub-pel pixel values for input into a temporal prediction block 242. Filter determiner 106 implicitly determines interpolation filter 108 as will be described below. Also, filter signaling block 110-2 receives signals information for use in determining interpolation filter 108 at certain times. Temporal prediction block 242 performs temporal prediction using decoded motion vector information and interpolated sub-pel pixel values outputted by interpolation filter 108 in a motion compensation operation. Temporal prediction block 242 outputs the prediction PU, x'.

Interpolation Filter Selection

Figure 3:
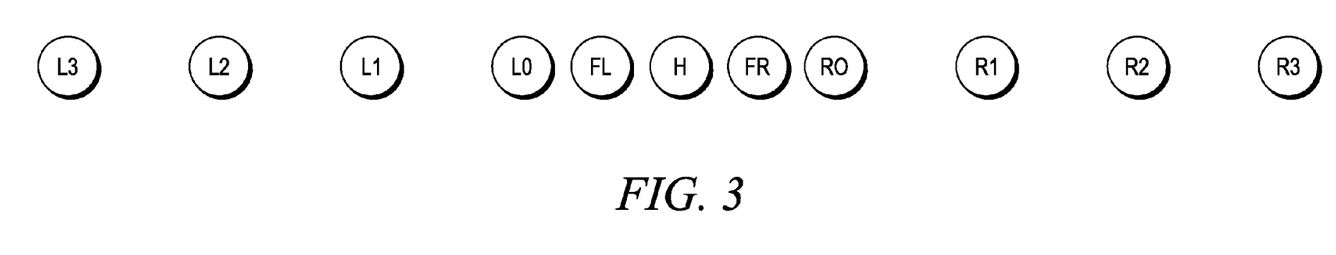
FIG. 3 depicts positions of half-pel and quarter-pel pixels between full-pel pixels along a pixel line within an image according to one embodiment.

To estimate a fractional pixel (sub-pel displacements), an image signal on each sub-pel position is generated by an interpolation process. FIG. 3 depicts positions of half-pel and quarter-pel pixels between full-pel pixels along a pixel line within an image according to one embodiment. For example, the pixel line may be along a row or column of an image. Full-pel pixels are represented by integer pixels and are shown in FIG. 3 as pixels L3, L2, L1, L0, R0, R1, R2, and R3. H is a half-pel pixel between full-pel pixels L0 and R0. FL is a sub-pel pixel (quarter-pel pixel) between full-pel pixels L0 and H and FR is a sub-pel pixel between half-pel pixel H and full-pel pixel R0.

The quarter-pel and half-pel pixels may be interpolated using the values of spatial neighboring full-pel pixels. For example, the half-pel pixel H may be interpolated using the values of full-pel pixels L3, L2, L1, L0, R0, R1, R2, and R3. Different coefficients may also be used to weight the values of the neighboring pixels and provide different characteristics of filtering.

The number of taps and coefficient values may be varied. For example, to determine an ideal sub-pixel value, interpolation filters 108 may be linear in phase with a unity gain. The constant (unity) gain is required to make sure the filters do not distort the signal. However, in practice, it may not be possible to have a constant unity gain for all frequencies. Thus, one of the goals for designing interpolation filters 108 is to make a linear phase filter (with appropriate phase slope or group delay) to have a gain response that is as flat and as wide as possible. Different trade-offs between flatness and wideness of a frequency response result in different sub-pixel interpolation filters. For example, since for natural images most of the signal is concentrated at low and middle frequencies, it may be preferred to have an interpolation filter 108 that is as flat as possible in the low and middle frequencies, while the high frequencies may have more fluctuations. For noise cancellation, it may be preferable that the sub-pixel interpolation filters 108 attenuate signals where the noise is present. The shape of the noise may depend on the picture content and the amount of compression. For example, compression noise for low quantization regimes tends to be flatter. Due to the low frequency nature of natural scenes and the possibility of having high-frequency compression noise, it may be desirable to have a low-pass filter with a gain response to minimize the signal distortion due to compression noise and signal attenuation. A balance between the flatness and wideness of the sub-pixel interpolation filters 108 is desired in the interpolation filter design. Thus, different interpolation filters 108 may be used for different PUs based on localized characteristics of each PU.

Figure 4:
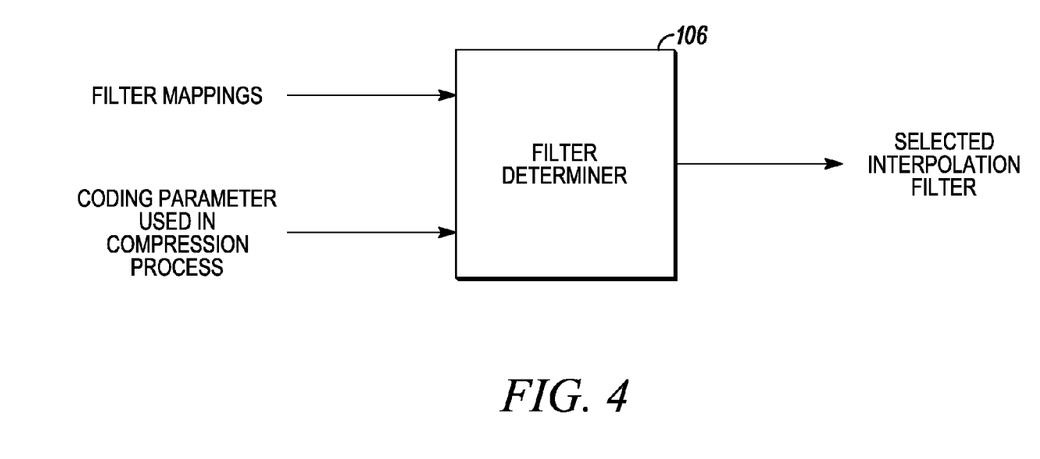
FIG. 4 shows a more detailed example of a filter determiner according to one embodiment.

As discussed above, particular embodiments use implicit signaling to determine which interpolation filter 108 to use. FIG. 4 shows a more detailed example of filter determiner 106 according to one embodiment. As shown, filter determiner 106 receives a mapping between the interpolation filters 108 and coding parameters associated with the compression process. For example, the mapping may be between interpolation filters 108 and a PU size or a prediction index. Filter determiner 106 then implicitly decides which interpolation filter 108 to use based on the mapping between the interpolation filter 108 and the characteristic. The determined interpolation filter 108 is then output and used to interpolate sub-pel pixel values.

Interpolation Filter Selection Using PU Size

Figure 5:
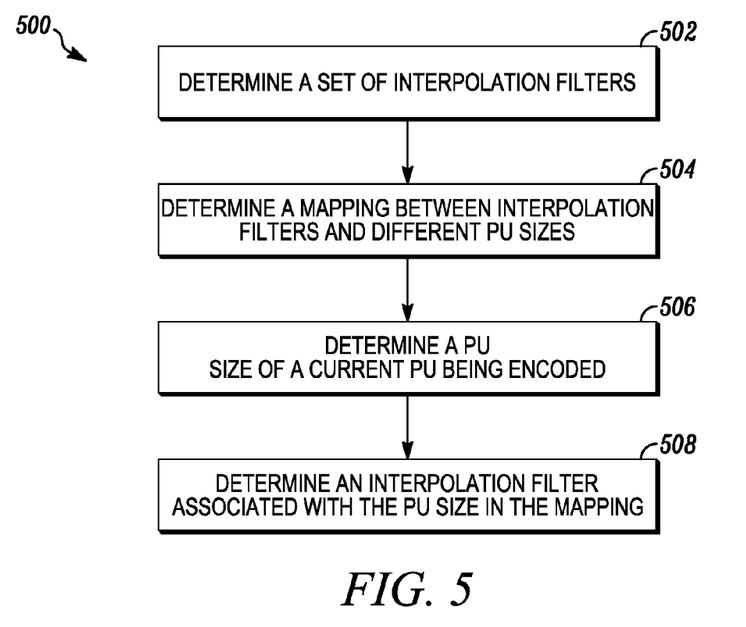
FIG. 5 shows a simplified flowchart of a method for determining an interpolation filter using PU size according to one embodiment.

As discussed above, the coding parameter used may be PU size or a prediction index. FIG. 5 shows a simplified flowchart 500 of a method for determining an interpolation filter 108 using PU size according to one embodiment. At 502, filter determiner 106 determines a set of interpolation filters 108. For example, a specific set of interpolation filters 108 may be provided for half-pel pixel interpolation and another specific set of interpolation filters 108 are provided for quarter-pel pixel interpolation. Each interpolation filter 108 may include different interpolation filter settings, such as the number of taps, and the values of coefficients may vary. When different interpolation filters 108 are referred to, this may mean that different settings are used in interpolation filters 108.

At 504, filter determiner 106 determines mappings between interpolation filters 108 and different PU sizes. The PU size may be the size of the PU being encoded or decoded. Although a PU is discussed, other units of video content may be used (e.g., a coding unit size). The mapping may map, for each sub-pel pixel positions, an interpolation filter 108 to a PU size. In one example, the number of interpolation filters 108 used may be as large as the number of possible PU sizes. In one example, an interpolation filter 108 may be mapped to a PU size of a width or height of the PU that is less than or equal to 8 pixels. An example of the mapping will be described in more detail below.

At 506, filter determiner 106 determines a PU size of a current PU being encoded or decoded. For example, decoder 104 may determine the PU size from the input bitstream. Also, encoder 102 may choose the PU size based on an evaluation of performance, video content, or some other characteristic. Using the PU size, at 508, filter determiner 106 determines the interpolation filter associated with the PU size in the mapping, for example, the coefficient values used to an interpolate a sub-pel pixel value.

Particular embodiments may use the size of a current PU to determine the interpolation filter 108 because PU size may be an indication of the characteristics of the reference block when the quality of coded pictures is consistent for consecutive frames. In other words, the compression quality from frame to frame may not generally change much. In this case, smaller PU sizes may use wider-band low pass interpolation filters 108 and larger PU sizes may use narrower-band low pass interpolation filters 108. One reason why the wider-band low pass interpolation filter 108 is used for smaller PU sizes is because the smaller PU size is selected because of certain reasons. For example, a bit budget may be high so it is justifiable to send extra prediction mode information for smaller PU sizes. Using the high bit-budget assumption, the quantization noise of the reference block may be negligible given the consistent quality of consecutive frames. In these cases, there is not much noise due to quantization meaning that there will not be much benefit from narrower band interpolation filters 108. In this case, a wider band interpolation filter may be preferred to preserve the possible high frequency content of the signal. Also, when smaller PU sizes are selected, the image may contain considerable contrast that goes through inconsistent motion. Because high contrast usually implies high frequency content, a wider interpolation filter 108 may be suitable in this case. The opposite argument can be used to justify the use of a narrower band interpolation filter 108 for larger PU sizes. Although the above justifications are described, it will be understood that other justifications may be used to select different interpolation filters 108.

One example of different interpolation filters 108 to use based on PU size is described. The coefficients are used to weight the values of integer pixels depicted in FIG. 3. In one example using PU size, if PU width is no larger than 8 pixels or PU height is no larger than 8 pixels, then sub-pel pixels FL and FR are interpolated using values of spatially neighboring full-pel pixels L3, L2, L1, L0, R0, R1, R2, and R3 as follows:

$$FL=(-1*L3+4*L2-10*L1+57*L0+19*R0-7*R1+3*R2-1*R3+32)>>6;$$

$$FR=(-1*L3+3*L2-7*L1+19*L0+57*R0-10*R1+4*R2-1*R3+32)>>6;$$

The quarter-pel positions (FL and FR) are calculated by applying coefficient values to the full-pel pixel values (L3, L2, L1, L0, R0, R1, R2, and R3). For example, a full-pel pixel value is multiplied by a corresponding coefficient value. Then, the results of the multiplied values are added together. A value of "32" is added and the result is right shifted by "6". The adding of "32" and shifting to the right (6 bits) is equivalent to adding 32 and dividing by 64, which truncates the value. Other operations are also contemplated. For example, a different truncating operation may be performed.

If the PU width is larger than 8 pixels and PU height is larger than 8 pixels, sub-pel pixels FL and FR are interpolated using the following interpolation filter values:

$$FL=(-1*L3+3*L2-9*L1+57*L0+18*R0-6*R1+2*R2-0*R3+32)>>6;$$

$$FR=(-0*L3+2*L2-6*L1+18*L0+57*R0-9*R1+3*R2-1*R3+32)>>6;$$

Table 1 summarizes the filter coefficients used as follows:

TABLE 1

| POSITION | | COEFFICIENTS |
|---|---|---|
| PUWIDTH <= 8 OR PUHEIGHT <= 8 | FL | {-1, 4, -10, 57, 19, -7, 3, -1,} |
| | FR | {-1, 3, -7, 19, 57, -10, 4, -1,} |
| PUWIDTH > 8 AND PUHEIGHT > 8 | FL | {-1, 3, -9, 57, 18, -6, 2, 0,} |
| | FR | {0, 2, -6, 18, 57, -9, 3, -1,} |

In one implementation, the operation in which a coefficient is 0, such as "0*R3" or "0*L3" may be skipped. That means only a 7-tap interpolation filter is needed if PU width is larger than 8 pixels and PU height is larger than 8 pixels because one of the taps has a coefficient of 0 for both of these conditions.

Interpolation Filter Selection Using a Prediction Index

In another embodiment, interpolation filter 108 filter may be determined based on a prediction index. The prediction index may be a list. For prediction of a current PU, a number of prediction blocks may be used. The prediction blocks may differ and may be signaled by motion vectors in reference to a reference picture. The weighted averaging of these prediction blocks may be used to determine a final prediction for a current PU. The different choices for the prediction block may be specified in an indexing scheme. For example, with n prediction block choices, any combination of $2^n-1$ prediction blocks may be used. Each combination may be defined by a prediction combination index (PCI). In one embodiment, filter determiner 106 may use the prediction combination index to determine interpolation filter 108. Different interpolation filters 108 may be selected based on the prediction combination index determined, and also for different sub-pel pixel positions. Although the prediction combination index is described, other information based on the prediction index may be used.

Figure 6:
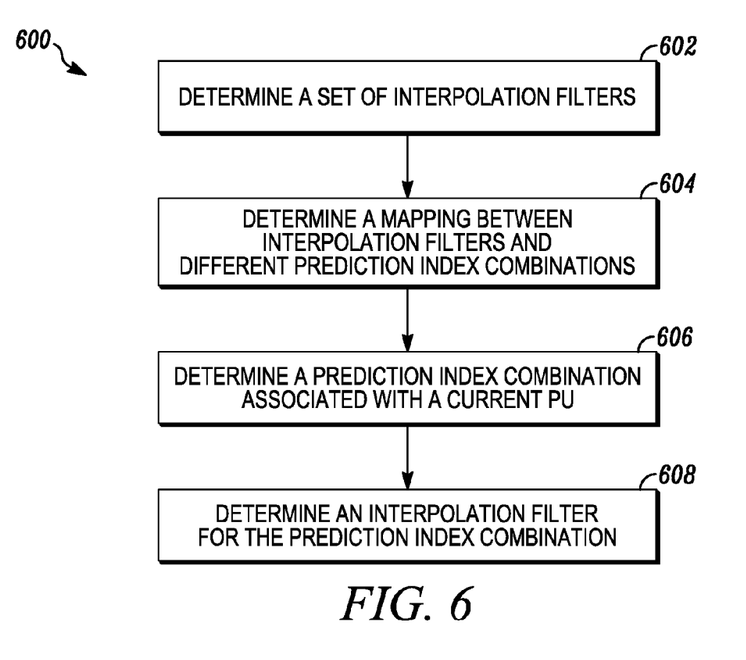
FIG. 6 depicts a simplified flowchart of a method for determining an interpolation filter using a prediction index according to one embodiment.

FIG. 6 depicts a simplified flowchart 600 of a method for determining an interpolation filter 108 using a prediction index according to one embodiment. At 602, filter determiner 106 determines a set of interpolation filters 108. Also, at 604, filter determiner 106 determines a mapping between interpolation filters 108 and different prediction index combinations. For example, each prediction combination index may be associated with a different interpolation filter 108.

At 606, filter determiner 106 determines a PCI associated with a current PU. For example, the PCI may be defined for a current PU being encoded or decoded. At 608, filter determiner 106 determines an interpolation filter 108 for the PCI. For example, the mapping from each PCI to an interpolation filter 108 is used to determine the interpolation filter. In one example, uni-prediction mode may have a choice between two prediction indexes. Based on which of a first index and a second index is selected, different interpolation filters 108 may be determined Also, with bi-prediction, two prediction indices may be selected. For a third index, a first interpolation filter may be selected and for the fourth index, a second interpolation filter may be selected. Different interpolation filters for first, second, third, and fourth indices in the uni prediction and the bi-prediction may be used.

One example of using the prediction index to determine interpolation filter 108 will now be described, but other examples may also be appreciated. In one embodiment, in HEVC, there may be up to two reference blocks for each PU (bi-prediction mode). In one embodiment, the reference blocks would be found on two different prediction index lists. For example, a first prediction index is used to index reference blocks located before the PU in time and a second prediction index is used to index reference blocks located after the PU in time. If there are two reference blocks, then an interpolation filter 108 with a wider pass-band may be used to include more of the signal high frequencies. If there are two reference blocks, then it is also possible to have different interpolation filters 108 for each reference block. Although wider pass-band interpolation filters 108 pass more coding noise due to the averaging of the prediction block to form the final prediction for the current PU, the noise would be attenuated while the signal would be unchanged after averaging. In another case, if there is only one prediction block for the current PU (uni-prediction mode) and that prediction block comes from a first reference list (e.g., a reference list that includes pictures that are located before the PU in time), then filter determiner 106 applies an interpolation filter 108 that is narrower than the above wider-pass band interpolation filters 108 to cancel more noise. In a third case, if there is only one prediction block for a current PU and that prediction block comes from a second reference list (e.g., a reference list that includes pictures that are located after the PU in time), then filter determiner 106 applies another interpolation filter 108 that is even narrower than in the second case to cancel even more noise.

One example of determining interpolation filters 108 based on the prediction index is described. For example, the mode of uni-prediction or bi-prediction is used to determine interpolation filter 108. If a bi-prediction mode is used, then a certain interpolation filter is used. However, if a uni-prediction mode is used for the PU, then a choice of prediction indexes may be made. Depending on which prediction index is selected, different interpolation filters 108 are used.

Accordingly, implicit signaling is used to determine the interpolation filter. Thus, explicit signaling between an encoder 102 and decoder 104 is not needed to signal the interpolation filter that should be used. Rather, encoder 102 and decoder 102 use information that is already available to the encoder and decoder to make a determination on the interpolation filter that is used.

High Level Adaptive Interpolation Filter Signaling

Figure 7:
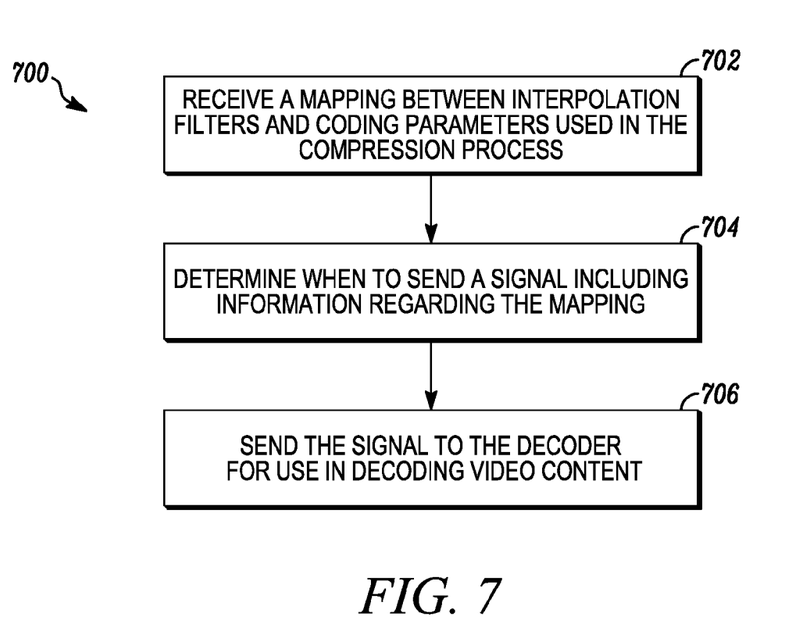
FIG. 7 depicts a simplified flowchart of a method for performing adaptive interpolation filter signaling according to one embodiment.

Even though implicitly deriving interpolation filter 108 is used, particular embodiments use explicit signaling at certain times. The explicit signaling may be used in conjunction with the implicit derivation and/or without the implicit derivation. FIG. 7 depicts a simplified flowchart 700 of a method for explicitly performing adaptive interpolation filter signaling according to one embodiment. At 702, a mapping between interpolation filters 108 and characteristics of the compression process is received. For example, both encoder 102 and decoder 104 receive the mapping. This mapping may be received for the implicit determination of interpolation filter 108. As described above, the encoding and decoding of video content is performed using the mappings.

At 704, filter signaling block 110-1 determines when to send a signal including information regarding the mapping. In one embodiment, filter signaling block 110-1 may send the signal for each PU, CU, picture, or part of picture that is being encoded. Also, other times, such as when the mappings are updated or when additional information is required for decoding the PU, filter signaling block 110-1 may send the signal.

At 706, filter signaling block 110-1 sends the signal to filter signaling block 110-2 in decoder 104 for use in decoding video content when it is determined the signal should be sent. Decoder 104 uses the information to decode a block of video content by determining a coding parameter, such as PU size or a prediction index, used in the compression process and determining an interpolation filter 108 in the set of interpolation filters based on a mapping between the interpolation filter and the coding parameter. The information received from filter signaling block 110-1 is used to determine interpolation filter 108. For example, the selection of the mapping uses information in the signal to determine which interpolation filter 108 to use. The information may be used for one unit or may be used for multiple units.

In one example, the information includes a change to the mapping between interpolation filters 108 in the set of interpolation filters 108 and coding parameters used in the compression process. In this case, the mapping that was previously stored at encoder 102 and decoder 104 is replaced. The new mappings will then be used thereafter.

In another example, the information indicates which interpolation filter 108 in a group of interpolation filters 108 to select. For example, decoder 104 uses a mapping to determine a filter family (multiple interpolation filters 108). Then, the information explicitly sent indicates which interpolation filter 108 in the filter family should be used. In another example, the information is used to select the family of interpolation filters.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method for encoding or decoding video content, the method comprising:
    determining a mapping between interpolation filters in a set of interpolation filters and sizes of different prediction units within the video content, the set of interpolation filters for use in interpolating sub-pel pixel values;
    receiving a first prediction unit of the video content;
    determining a size of the first prediction unit;
    determining an interpolation filter in the set of interpolation filters to interpolate a sub-pel pixel value for use in a temporal prediction process for the first prediction unit by comparing the size of the first prediction unit to the mapping to select the interpolation filter in the set of interpolation filters associated with the size of the first prediction unit in the mapping;
    when the one or more computer processors includes an encoder, transmitting the mapping between the interpolation filters and the sizes from the encoder to a decoder and not signaling, from the encoder to the decoder, which interpolation filter was determined to interpolate the sub-pel pixel value during the temporal prediction process; and
    when the one or more computer processors includes the decoder, determining the mapping between the interpolation filters and the sizes by receiving the mapping between the interpolation filters and the sizes at the decoder from the encoder and not receiving a signal at the decoder from the encoder regarding which interpolation filter was determined to interpolate the sub-pel pixel value during the temporal prediction process.

2. The method of claim 1, further comprising:
    receiving the mapping at the decoder before receiving the first prediction unit of video content.

3. The method of claim 1, further comprising:
    interpolating the sub-pel pixel value using the interpolation filter; and
    outputting the sub-pel pixel value to a temporal prediction block that uses the sub-pel pixel value to perform the temporal prediction process.

4. The method of claim 1, wherein the determined interpolation filter is adaptive based on different sizes received.

5. The method of claim 1, further comprising:
    determining when to send a signal including information regarding the mapping from the encoder to the decoder; and wherein, when the one or more computer processors includes the decoder, the method further comprises:
    storing the mapping in the decoder.

6. The method of claim 5, wherein the information comprises the mapping.

7. The method of claim 5, wherein the information comprises a change to an existing entry within the mapping between an interpolation filter in the set of interpolation filters and a size of a prediction unit; wherein, when the one or more computer processors includes the decoder, the method further comprises:
    storing the change with the mapping previously stored at the decoder.

8. The method of claim 5, wherein the information is signaled in a high level syntax.

9. An apparatus configured to decode video content, the apparatus comprising:
    one or more computer processors; and
    a computer-readable storage medium comprising instructions for controlling the one or more computer processors to be operable to:
        receive, at a decoder, a mapping between interpolation filters in the set of interpolation filters and sizes of different prediction units within the video content;
        receive, at the decoder, a first prediction unit of video content without receiving a signal from an encoder as to which interpolation filter was determined to interpolate a sub-pel pixel value for use in a temporal prediction process for the first prediction unit;
        determine a size of the first prediction unit;
        determine, at the decoder, an interpolation filter using the set of interpolation filters to interpolate the sub-pel pixel value for use in the temporal prediction process for the first prediction unit by comparing the size of the first prediction unit to the mapping to select the interpolation filter in the set of interpolation filters associated with the size of the first prediction unit in the mapping; and
    decode the first prediction unit using the temporal prediction process.

10. The apparatus of claim 9, wherein the mapping is received at the decoder from the encoder prior to receiving the first prediction unit of video content.

11. The apparatus of claim 9, further comprising:
    interpolating the sub-pel pixel value using the interpolation filter; and
    outputting the sub-pel pixel value to a temporal prediction block that uses the sub-pel pixel value to perform the temporal prediction process.

12. The apparatus of claim 9, wherein the determined interpolation filter is adaptive based on different sizes of the prediction units received.

13. The apparatus of claim 9, further comprising:
    determining when to send a signal including information regarding the mapping from the encoder to the decoder.

14. The apparatus of claim 13, wherein the information comprises a change to an entry in the mapping between an interpolation filter in the set of interpolation filters and a size of a prediction unit, and wherein the instructions further comprises instructions to:
    update the mapping as previously stored at the decoder with the change.

15. A non-transitory computer-readable storage medium comprising instructions for encoding video content, the instructions for controlling the one or more computer processors to be operable to:
    determine a mapping between interpolation filters in a set of interpolation filters and sizes of different prediction units within the video content, the set of filters for use in interpolating sub-pel pixel values;
    receive, at an encoder, a first prediction unit of the video content;
    determine a size of the first prediction unit;
    determine, at the encoder, an interpolation filter in the set of interpolation filters to interpolate a sub-pel pixel value for use in a temporal prediction process for the first prediction unit by comparing the size of the first prediction unit to the mapping to select the interpolation filter in the set of interpolation filters associated with the size of the first prediction unit in the mapping;
encode the first prediction unit using the temporal prediction process;
transmit the mapping between the interpolation filters and the sizes from the encoder to a decoder; and
transmit, from the encoder to the decoder, the first prediction unit as encoded without signaling to the decoder which interpolation filter was determined to interpolate the sub-pel pixel value.

* * * * *